Aug. 21, 1956 WILLIAM I. L. WU 2,760,081
SWEEP CIRCUITS FOR PANORAMIC DEVICES
Filed Sept. 8, 1954
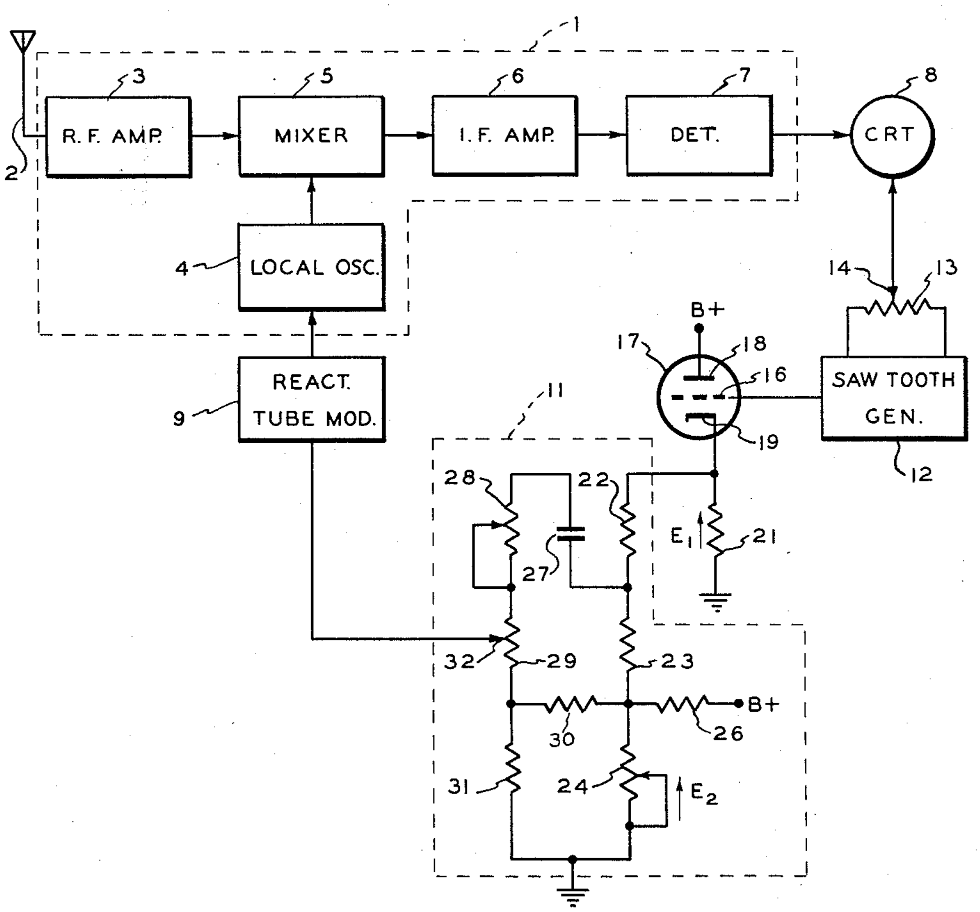
INVENTOR
WILLIAM I. L. WU
BY Hyman Hurvitz
ATTORNEY United States Patent Office 2,760,081

Patented Aug. 21, 1956

2,760,081

SWEEP CIRCUITS FOR PANORAMIC DEVICES

William I. L. Wu, Forest Hills, N. Y., assignor to Panoramic Radio Products, Inc., Mount Vernon, N. Y., a corporation of New York Application September 8, 1954, Serial No. 454,736

12 Claims. (Cl. 307—2)

The present invention relates generally to mixing circuits for direct and alternating signals, and more particularly to improved circuits for combining without interaction A. C. scanning voltage and D. C. center frequency control voltage, for application to reactance tube frequency scanning circuits of frequency scanning devices.

It is desirable, in frequency scanning or frequency modulating devices, to be able to vary the width of the band of frequencies which is scanned by the device while maintaining constant its center frequency. In general frequency scanning in such devices is accomplished in response to an A. C. voltage, the magnitude of which determines the scanned band width, while the center frequency of the frequency band under examination is controlled in response to a D. C. variable voltage. In accordance with the present invention, I provide a novel mixer circuit for combining the A. C. sweep width control voltage and the D. C. center frequency control voltage, each without interaction on the other. The invention finds particular utility in frequency scanning devices having a low scanning rate, and where the center frequency of the scan is required to remain fixed while the extent of scanning is being varied.

Since such scanning devices are commonly employed in frequency scanning panoramic receivers, the invention will be described as applied to such a receiver, without intending to limit the scope of the claims to any particular application.

Panoramic devices are employed to display visually the frequency content of a band of frequencies, i. e. the amplitude of each signal within the band plotted against a base line effectively calibrated in terms of frequency. A frequency scanning receiver is employed, in the more common types of panoramic devices, which scans over a frequency band under examination in response to a periodic scanning voltage wave applied to a voltage responsive tuner or frequency scanning device, included in the frequency scanning receiver. The extent of width of the band of frequencies which is scanned by the device is then a function of the peak-to-peak magnitude of the periodic scanning voltage, and means are provided for controlling and varying this magnitude in order to enable scan width control. The center frequency of the frequency band under examination is also subject to control, by applying a controllable D. C. voltage to the voltage responsive tuner or scanning device.

In order to provide a visual display of the frequency content of the band of frequencies, a cathode ray tube indicator is commonly employed. In such cases the ray of the indicator is usually swept in one coordinate direction in synchronism with the scanning voltage, to provide a base line calibratable in frequency, and is deflected in another coordinate direction in response to the signal output of the frequency scanning voltages. A plot of amplitude against frequency is thus generated on the face of the cathode ray tube.

In accordance with a preferred embodiment of the present invention, I prefer to employ a panoramic device of the type above briefly and generally described, which employs a reactance receiver, as the voltage responsive tuner of a frequency scanning device. However, I realize that other types of receivers and of voltage responsive frequency scanning circuits are available, and may be employed in the practice of the present invention.

In a preferred form of my invention, frequency scanning of the oscillator of a superheterodyne receiver is accomplished by varying a control voltage applied to a reactance tube. The control voltage is preferably of sawtooth form, and is coupled to the reactance tube via a capacitive circuit. The sweepwidth of the scanned frequency spectrum is then determined by the maximum amplitude of the sawtooth scanning voltage, which may be varied by a voltage divider. In addition to the sweepwidth control circuit, there is provided a center frequency control circuit, for determining the center frequency of the frequency band through which the local oscillator is swept. The center frequency control circuit provides a D. C. voltage, which is applied to the reactance tube to determine its fixed bias voltage.

It is desirable, in panoramic devices of the type herein described, to provide a mixing circuit for combining the center frequency and sweepwidth control voltages, the output of the mixing circuit being connected to a single control element of the reactance tube, to control both the fixed voltage and the voltage variation applied thereto. In those instances where it is desirable to sweep through the desired frequency spectrum at a slow rate, for example one sweep per second, the time constant of the capacitive circuit which couples the sawtooth voltage to the reactance tube must be large so that the sawtooth voltage wave form will not be distorted. In the absence of special provisions, variation of the D. C. control voltage produces a transient voltage in the capacitive coupling circuit, which temporarily shifts the center frequency of the scanned frequency band. The center frequency will remain shifted until the transient voltage in the coupling circuit disappears, which may require a relatively long time because of the relatively long time constant of the circuits involved. This type of interaction between the center frequency and the sweep control circuits of the system is highly undesirable.

In accordance with the present invention there is provided a mixing circuit which eliminates the difficulty hereinabove referred to by maintaining constant the average D. C. voltage appearing across the coupling capacitor, during adjustments of the center frequency control voltage. To this end, the invention provides a bridge-type resistance network in which the arrangement and value of the resistors in the network are such that equal portions of the center frequency control voltage always appear in the same polarity at both terminals of the sweep voltage coupling capacitor. Variation of center frequency control voltage sets up no variation of charge on the coupling capacitor, and therefore no transient response.

It is, accordingly, a broad object of the present invention to provide an improved circuit for combining A. C. and D. C. voltages, without interaction between the voltages.

It is another object of the present invention to provide an improved mixing circuit which combines the voltage outputs of an A. C. source and a D. C. source, without generation of transients in the A. C. circuit in response to variations in the voltage output of the D. C. circuit.

Still another object of the present invention is to provide a novel and improved mixing circuit for combining the voltage output of an A. C. sweepwidth control circuit with the voltage output of a D. C. center frequency control circuit, in a frequency modulated oscillator, without interaction between the center frequency circuit and the sweepwidth control circuit.

Yet another object of the present invention is to provide in a panoramic device employing reactance tube oscillator tuning, in which the frequency of oscillations of a local oscillator is varied over a predetermined frequency band in response to a sawtooth voltage applied to the reactance tube via a long time constant capacitive circuit, and in which the center frequency of the frequency band is determined by a D. C. reactance tube control voltage, a novel and improved resistive mixing network in which the D. C. voltage which appears across the coupling capacitor is independent of the value of and variations in the amplitude of the D. C. control voltage.

The above and still further features, objects, and advantages of the present invention will become apparent upon consideration of the following detailed description of a specific embodiment of the invention, especially when taken in conjunction with the accompanying drawing, wherein the single figure is a functional block diagram of an exemplary panoramic system, including a schematic circuit diagram of a novel and improved mixing circuit, in accordance with the present invention.

Referring to the figure of the accompanying drawings, a superheterodyne receiver, generally designated 1, receives signals intercepted by an antenna 2, or analogous signal intercept device, such as a sonic transducer. The signals may be amplified by a wide band R. F. amplifier 3 and heterodyned with the output of a local oscillator 4 in a mixer circuit 5. The heterodyne output of the mixer circuit 5 is amplified in a relatively narrow band intermediate frequency amplifier 6. If the incoming signal at the antenna 2 contains a frequency which differs from the frequency of oscillation of the local oscillator 4 by an amount equal to the intermediate frequency, the mixer circuit 5 provides a signal at the intermediate frequency, which is amplified by the I. F. amplifier 6. The output of the I. F. amplifier 6 is detected in detector 7, and the detected signal, usually after suitable video amplification, is applied to the beam deflection devices, not shown, of a cathode ray tube 8, producing beam deflections in a first coordinate direction.

Panoramic devices are usually employed to provide a visual indication of the frequencies of signals within a predetermined frequency spectrum. In order to achieve this result the frequencies in the predetermined frequency spectrum are converted in sequence to the intermediate frequency, by cyclically sweeping the frequency of the local oscillator 4 between suitable minimum and maximum frequencies. Thereby, frequencies in a relatively wide band of frequencies are converted in sequence to the I. F. frequency during each frequency scan of the local oscillator 4, and produce deflection signals for application to cathode ray tube 8.

Variations in the output frequency of the local oscillator 4 are achieved by varying the bias on a reactance tube tuner 9 which, as is well known, produces variations in the frequency in the local oscillator 4 when the reactance tube tuner 9 is properly connected in the frequency determining network of the oscillator. The reactance tube tuner 9 is connected to receive a D. C. center frequency control voltage and an A. C. sweepwidth control voltage from a mixer circuit, generally designated 11. The D. C. center frequency control voltage is generated internally of the mixer circuit 11 and is applied to the reactance tube 9 to fix the D. C. bias thereon, thereby determining the center frequency about which the oscillator 4 is to oscillate. The output of the mixer circuit 11 also contains a periodic sawtooth voltage, which varies the bias on the reactance tube 4, thereby producing linear periodic variations in the local oscillator frequency about the center frequency as determined by the fixed D. C. bias, the amplitude of the sawtooth voltage wave determines the band width of the frequency variations of the local oscillator 4.

Two similar synchronized sawtooth voltage waves are derived from a sawtooth voltage generator 12, a first of which is applied to the mixer circuit 11, and a second of which appears across a resistor 13. A portion of the sawtooth voltage appearing across the resistor 13, as determined by the position of a slider 14, is applied to a deflection circuit of the cathode ray tube 8. The application of the sawtooth voltage wave to the cathode ray tube 8 synchronizes a sweep of the cathode ray beam with the sweep of the local oscillator, so that the various frequencies passed by the I. F. amplifier 6 appear at intervals and in sequence across the face of the tube 8.

The first output of the sawtooth voltage generator 12 is directly applied to a control grid 16 of a tube 17 which is operated as a cathode follower to provide a low impedance output for the mixer circuit 11. The tube 17 has a plate 18, which is directly connected to a positive terminal of a plate voltage supply, and a cathode 19 which is connected through a cathode resistor 21 to ground. The cathode resistor 21 is shunted by series connected resistors 22, 23, and variable resistor 24, one end of resistor 22 being connected to the cathode 19 and one end of resistor 24 being connected to ground. A resistor 26 is connected from the junction of resistors 23 and 24 to a positive terminal of the plate voltage supply. The resistors 24 and 26 constitute a voltage divider, the voltage across the resistor 24 providing the D. C. center frequency control voltage. Variation of the value of the resistor 24 changes the D. C. bias on the reactance tube 9, thereby varying the center frequency of the local oscillator 4.

A coupling capacitor 27 has one terminal connected to a junction of resistors 22 and 23, and the other terminal connected to a variable resistor 28. A resistor 29 has one end connected to the resistor 28 and the other end connected to ground through a resistor 31. A resistor 30 is connected between the junction of resistors 23 and 24 and the junction of resistors 29 and 31. The resistor 29 is provided with a slider 32, which is connected to the input of the reactance tube 9. The capacitor 27 and resistors 28 and 29 constitute an A. C. coupling circuit for connecting the sawtooth voltage output of the tube 17 to the reactance tube 9. The variable resistor 28 is utilized as a sweep limit control, since the maximum amplitude of the sawtooth voltage available across the resistor 29 is determined by the setting of the resistor 28. The setting of the slider 32 on resistor 29 is employed as a sweep width control since it determines the amplitude of the sawtooth voltage applied to the reactance tube 9, within the limits established by the setting of the resistor 28.

In those cases where it is desirable to employ a slow sweep rate of the local oscillator 4 the A. C. coupling circuit must have a long time constant, to avoid distortion of the sawtooth wave. Since the coupling capacitor 27 is connected between the source of sawtooth voltage waves and the reactance tube 9, any disturbance in the D. C. voltage across this capacitor will produce a change in the bias on the reactance tube 9, thereby producing an unwanted shift in the frequency of the local oscillator 4. In many applications this disturbance may be slight. However, as a result of the long time constant of the A. C. coupling circuit in the system herein described, such a disturbance produces a frequency shift which endures for a relatively long period and therefore is objectionable. In mixing circuits heretofore known to me any change in the D. C. voltage across the coupling capacitor 27 produces an objectionable shift in the frequency of oscillation of the local oscillator 4.

The mixer circuit 11 of the present invention eliminates the above referred to difficulty by maintaining the D. C. voltage across the coupling capacitor independent of the D. C. center frequency control voltage. To this end specific relationships are required among the values of the various resistors in the mixer circuit 11. The values of resistors 21 and 24 must be much smaller than the combined values of resistors 22 and 23.

Assume that $E_1$ is the voltage across the cathode resistor 21, and $E_2$ the D. C. voltage across resistor 24. Assume further that the values of resistors 22, 23 are relatively large and the values of resistors 21 and 24 relatively small. It can then be shown that the voltage across condenser 27 is $$E_c=\frac{1}{1+\frac{R_{22}}{R_{23}}}E_1$$

provided $$\frac{R_{22}}{R_{23}}=\frac{R_{31}}{R_{30}}$$

It is to be noted that $E_c$ is then independent of $E_2$, and hence does not vary while $E_2$ is being varied. Since $E_2$ is varied by varying the center control resistance 24, adjustment of the latter does not produce a transient response at the output of mixer circuit 11. A specific relationship between $R_{22}$, $R_{23}$, $R_{30}$, $R_{31}$ which may be adopted, is $R_{22}=R_{23}$ and $R_{30}=R_{31}$.

While I have described and illustrated the specific embodiment of my invention various modifications thereof may be resorted to in respect to the general arrangement of the panoramic device as well as in the choice of the component elements of the mixer circuit without departing from the spirit of the invention as defined in the appended claims.

What I claim is:

1. A mixer circuit for combining D. C. center frequency control voltages and A. C. sweepwidth control voltages in a frequency scanning device, comprising a first resistance, means for developing an A. C. voltage across said first resistance, an output lead, a capacitor circuit, means connecting said capacitor circuit between said first resistance and said output lead, a second resistance, means for developing a variable D. C. voltage across said second resistance, and means for combining the A. C. and D. C. voltages, said last mentioned means including a resistive network which maintains the average D. C. voltage across said capacitor circuit constant during variations in the D. C. voltage.

2. A mixer circuit for combining D. C. center frequency control voltages and A. C. sweepwidth control voltages in a frequency scanning device comprising a first resistance, means for developing an A. C. voltage across said first resistance, an output lead, a capacitor circuit, means connecting said capacitor circuit between said first resistance and said output lead, a second resistance, means for developing a variable D. C. voltage across said second resistance, and means including a resistive network for combining the A. C. and D. C. voltages and for maintaining constant the average D. C. voltage across said capacitor circuit during variations in the D. C. voltage.

3. In combination, a mixer circuit for combining D. C. control voltages and A. C. control voltage without generation of transient voltages in response to variations in the D. C. control voltage, comprising a first resistance, means for developing an A. C. voltage across said first resistance, an output lead, a capacitor circuit having an input terminal and an output terminal, means connecting said input terminal to one end of said first resistance and connecting said output terminal to said output lead, a second resistance, means for developing a D. C. control voltage across said second resistance, means for combining said A. C. control voltage with said D. C. control voltage and means including a resistive bridge network for applying equal fractions of the D. C. control voltage to said input terminal and said output terminal of said capacitor circuit.

4. In a frequency scanning device, a mixer circuit for combining a D. C. center frequency control voltage and an A. C. sweepwidth control voltage comprising a first resistance, means for developing an A. C. control voltage across said first resistance, an output lead, a capacitor circuit having an input terminal connected to one end of said resistance and an output terminal connected to said output lead, a second resistance, means for developing a D. C. center frequency control voltage across said second resistance, first and second resistive network means connected to said second resistance for establishing first and second D. C. voltages having values equal to equal predetermined proportions of the D. C. center frequency control voltage, means for applying the first D. C. voltage to said input terminal of said capacitor circuit and means for applying the second D. C. voltage to said output terminal of said capacitor circuit.

5. In a frequency scanning device, a mixer circuit for combining a D. C. center frequency control voltage and an A. C. sweepwidth control voltage comprising a first resistance, means for developing an A. C. control voltage across said first resistance, an output lead, a capacitor circuit having an input terminal connected to one end of said resistance and an output terminal connected to said output lead, a second resistance, means for developing a D. C. center frequency control voltage across said second resistance, a resistive network having an input circuit and a first and a second output circuit, means connecting said input circuit across said second resistance, means for producing a first D. C. voltage at said first output circuit equal to a predetermined fraction of the D. C. voltage across the said second resistance, means for applying the first D. C. voltage to said input terminal to said capacitor circuit, means for producing a second D. C. voltage at said second output circuit equal to said predetermined fraction of the D. C. voltage across said second resistance and means for applying the second D. C. voltage to said output terminal of said capacitor circuit.

6. In a frequency scanning device a mixer circuit for combining an A. C. sweepwidth control voltage with a D. C. center frequency control voltage without generating transient voltages in response to variations in the D. C. center frequency control voltage comprising a first resistance, means for developing an A. C. sweepwidth control voltage across said first resistance, second, third and fourth resistances connected in series across said first resistance, said second resistance having an end connected to one end of said first resistance and said fourth resistance having one end connected to the other end of said first resistance, means for developing a D. C. sweepwidth control voltage across said fourth resistor, fifth and sixth resistances connected in series across said fourth resistance, the ratio of the values of said fifth and sixth resistances being equal to the ratio of the values of the second and third resistances and a capacitor circuit connected between the junction of said second and third resistances and the junction of said fifth and sixth resistances.

7. The combination according to claim 6 wherein the values of the second and third resistances are equal.

8. The combination in accordance with claim 6 wherein the combined value of said second and third resistances is much larger than the values of said first and fourth resistances.

9. The combination in accordance with claim 6 wherein said capacitor circuit comprises a capacitor and a seventh resistance connected in series, said capacitor having one end connected to the junction of said second and third resistances and the values of said capacitor and said seventh resistance being such as to provide a capacitor circuit having a long time constant.

10. In a frequency scanning device, a mixer circuit for combining a D. C. center frequency control voltage and an A. C. sweepwidth control voltage comprising a first resistance, means for developing an A. C. control voltage across said first resistance, an output lead, a capacitor circuit having an input terminal connected to one end of said resistance and an output terminal connected to said output lead, a second resistance, means for developing a D. C. center frequency control voltage across said second resistance, and means including a resistive network for causing equal portions of the D. C. center frequency control voltage to appear in the same polarity at both of said terminals of said capacitor network.

11. A mixer circuit for a variable voltage and a fixed voltage, comprising an input terminal for said variable voltage, an input terminal for said fixed voltage, an output terminal for variable voltage and fixed voltage, a coupling capacity having opposing terminals interposed between said input terminal for variable voltage and said output terminal, and means for applying equal voltages of the same polarity to said opposing terminals of said coupling capacitor in response to said fixed voltage.

12. In combination a mixing circuit for mixing and adjusting the values of an adjustable A. C. voltage and an adjustable D. C. voltage, a source of D. C. voltage of fixed amplitude, means for applying said voltage to said mixing circuit, a variable resistance in said mixing circuit for selecting a portion of said D. C. voltage of fixed amplitude as said adjustable D. C. voltage, a coupling capacitor for said adjustable A. C. voltage in said mixing circuit, and means for maintaining the voltage existent across said condenser in response to said adjustable D. C. voltage equal to zero for all values of said adjustable D. C. voltage.

No references cited.